M. BRENNER.
CANS FOR PRESERVING MEAT.
No. 187,591. Patented Feb. 20, 1877.
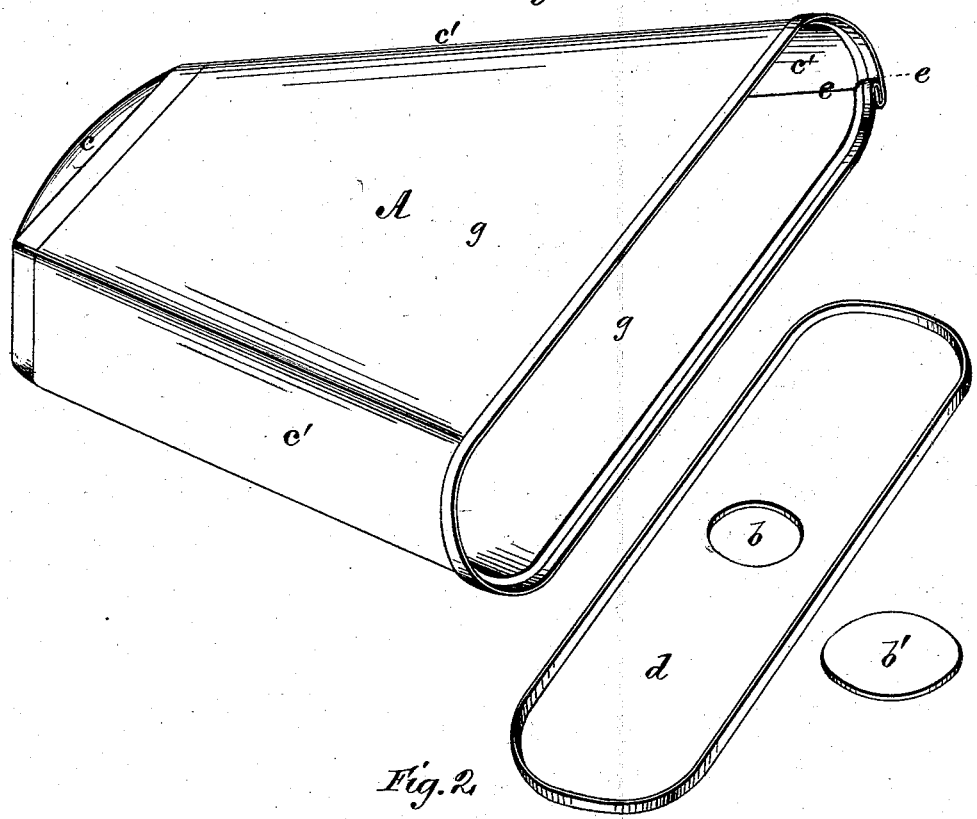
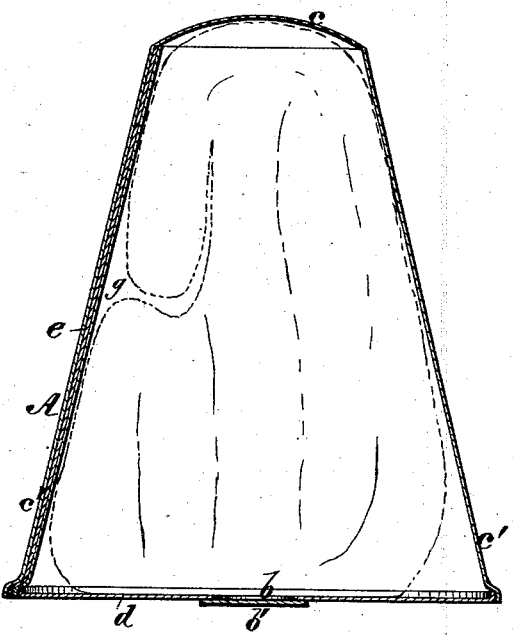
Witnesses.
James Martin Jr.
D. P. Cowl
Inventor:
Moses Brenner
by
Mason, Fenwick & Lawrence
attys

UNITED STATES PATENT OFFICE.

MOSES BRENNER, OF BALTIMORE, MARYLAND.

IMPROVEMENT IN CANS FOR PRESERVING MEAT.

Specification forming part of Letters Patent No. 187,591, dated February 20, 1877; application filed January 19, 1877.

*To all whom it may concern:*

Be it known that I, MOSES BRENNER, of the city of Baltimore, in the county of Baltimore and State of Maryland, have invented a new and Improved Can in which to pack and preserve cooked and uncooked meats; and I do hereby declare that the following is a full, clear, and exact description thereof, reference being had to the accompanying drawings, making part of this specification of said invention.

My invention relates to a can for the preservation of meats which have been cooked and thereafter put into cans and hermetically sealed therein for future use, as well as for preserving pickled meats which have not been cooked prior to being sealed up in cans.

In the drawings, Figure 1 shows my improved can in a condition to be "sealed up," and Fig. 2 is a section thereof, showing the can after meat has been sealed up therein.

As indicated in the drawings, the body A of the can is of peculiar shape, and may be described as having a form in the likeness of a flattened truncated cone. In other words, it is flattened on two sides to form parallel portions $g$ $g$, thus allowing economy of space in packing the can for transportation, as well as adapting itself to the ordinary form of meat as cut for table use, and has its portions $c$ and $c'$ rounded, in order that its interior surfaces may afford no obstruction to the removal of its contents. The top portion $c$, being rounded or concave, allows the small end of a piece of meat to be snugly doubled over, as shown in dotted lines in Fig. 2, and thus fill the space in that portion of the can; and, as there are no corners in which the meat can seat itself, or become wedged, the meat can be readily withdrawn on removal of the bottom $d$.

The body of the can between the top portion $c$ and bottom $d$ I make of a single piece of sheet-tin, united by a single lap-joint or seam, as at $e$, thus saving labor and expense in soldering, as compared with cans having a body constructed of more than one piece.

Fig. 1 shows the can ready to have the meat packed therein, and the bottom $d$ soldered thereon. After the bottom is soldered on, the air and superfluous moisture are then pumped out through the aperture $b$, whereupon the cover $b'$ is soldered over the aperture, thus completely sealing the can. If deemed of advantage, the aperture $b$ may be made small enough to be completely closed by solder, and thus dispense with the cover $b'$.

Having described my invention, what I claim as new, and desire to secure by Letters Patent, is—

A can for preserving meats, having its body A constructed to form a flattened truncated cone, with parallel portions $g$ $g$, and with an interiorly-concave top, $c$, and rounded portions $c'$, substantially as described.

Witness my hand in the matter of my application for a patent for an improved can for preserving meats this 13th day of January, A. D. 1877.

MOSES BRENNER.

Witnesses:
G. E. SANGSTOR,
O. GEO. DEAVER.